United States Patent

Panwar et al.

[11] Patent Number: 5,987,594
[45] Date of Patent: Nov. 16, 1999

[54] APPARATUS FOR EXECUTING CODED DEPENDENT INSTRUCTIONS HAVING VARIABLE LATENCIES

[75] Inventors: Ramesh Panwar, Santa Clara; Ricky C. Hetherington, Pleasanton, both of Calif.

[73] Assignee: Sun Microsystems, Inc., Palo Alto, Calif.

[21] Appl. No.: 08/881,726

[22] Filed: Jun. 25, 1997

[51] Int. Cl.⁶ ........................................... G06F 9/00
[52] U.S. Cl. ................. 712/216; 712/23; 712/24; 712/25; 712/205; 712/214; 712/215; 712/231; 712/233
[58] Field of Search ................ 395/800.23, 800.24, 395/800.25, 390, 392, 580, 501, 582; 712/23, 24, 75, 205, 214, 215, 231, 216, 233

[56] References Cited

U.S. PATENT DOCUMENTS

| | | |
|---|---|---|
| 4,970,641 | 11/1990 | Hester et al. ............................ 361/200 |
| 5,333,280 | 7/1994 | Ishikawa et al. ........................ 395/375 |
| 5,367,650 | 11/1994 | Sharangpani et al. .............. 395/800.23 |
| 5,442,757 | 8/1995 | McFarland et al. ................ 395/800.23 |
| 5,560,032 | 9/1996 | Nguyen et al. ..................... 395/800.23 |
| 5,603,047 | 2/1997 | Caulk et al. ........................ 395/800.23 |
| 5,655,096 | 8/1997 | Branigin .................................. 395/376 |

OTHER PUBLICATIONS

Smith, Alan Jay; "Cache Memories," *Computing Surveys*, vol. 14, No. 3, Sep. 1982, pp. 473–530.

*Primary Examiner*—Meng-Ai T. An
*Assistant Examiner*—Dzung C. Nguyen
*Attorney, Agent, or Firm*—Stuart T. Langley; Francis A. Sirr; Holland & Hart LLP

[57] ABSTRACT

A processor that executes coded instructions using an instruction scheduling unit receiving the coded instructions and issuing an instruction for execution. A replay signaling device generates a signal indicating when the instruction failed to execute properly within a predetermined time. A replay device within the instruction scheduling unit responsive to the signaling device then reissues the instruction for execution.

18 Claims, 7 Drawing Sheets

APPARATUS FOR EXECUTING CODED DEPENDENT INSTRUCTIONS HAVING VARIABLE LATENCIES

The subject matter of the present application is related to that of U.S. patent application Ser. No. 08/881,958, now U.S. Pat. No. 5,826,765 identified as Docket No. P2345/37178.830071.000 for AN APPARATUS FOR HANDLING ALIASED FLOATING-POINT REGISTERS IN AN OUT-OF-ORDER PROCESSOR filed concurrently herewith by Ramesh Panwar; Ser. No. 08/881,729 identified as Docket No. P2346/37178.830072.000 for APPARATUS FOR PRECISE ARCHITECTURAL UPDATE IN AN OUT-OF-ORDER PROCESSOR filed concurrently herewith by Ramesh Panwar and Arjun Prabhu; Ser. No. 08/881,726 identified as Docket No. P2348/37178.830073.000 for AN APPARATUS FOR NON-INTRUSIVE CACHE FILLS AND HANDLING OF LOAD MISSES filed concurrently herewith by Ramesh Panwar and Ricky C. Hetherington; Ser. No. 08/881,908 identified as Docket No. P2349/37178.830074.000 for AN APPARATUS FOR HANDLING COMPLEX INSTRUCTIONS IN AN OUT-OF-ORDER PROCESSOR filed concurrently herewith by Ramesh Panwar and Dani Y. Dakhil; Ser. No. 08/882,173, now U.S. Pat. No. 5,898,853 identified as Docket No. P2350/37178.830075.000 for AN APPARATUS FOR ENFORCING TRUE DEPENDENCIES IN A N OUT-OF-ORDER PROCESSOR filed concurrently herewith by Ramesh Panwar and Dani Y. Dakhil; Ser. No. 08/881,145 identified as Docket No. P2351/37178.830076.000 for APPARATUS FOR DYNAMICALLY RECONFIGURING A PROCESSOR filed concurrently herewith by Ramesh Panwar and Ricky C. Hetherington; Ser. No. 08/881,732 identified as Docket No. P2353/37178.830077.000 for APPARATUS FOR ENSURING FAIRNESS OF SHARED EXECUTION RESOURCES AMONGST MULTIPLE PROCESSES EXECUTING ON A SINGLE PROCESSOR filed concurrently herewith by Ramesh Panwar and Joseph I. Chamdani; Ser. No. 08/882,175 identified as Docket No. P2355/37178.830078.000 for SYSTEM FOR EFFICIENT IMPLEMENTATION OF MULTI-PORTED LOGIC FIFO STRUCTURES IN A PROCESSOR filed concurrently herewith by Ramesh Panwar; Ser. No. 08/882,311 identified as Docket No. P2365/37178.830080.000 for AN APPARATUS FOR MAINTAINING PROGRAM CORRECTNESS WHILE ALLOWING LOADS TO BE BOOSTED PAST STORES IN AN OUT-OF-ORDER MACHINE filed concurrently herewith by Ramesh Panwar, P. K. Chidambaran and Ricky C. Hetherington; Ser. No. 08/881,731 identified as Docket No. P2369/37178.830081.000 for APPARATUS FOR TRACKING PIPELINE RESOURCES IN A SUPERSCALAR PROCESSOR filed concurrently herewith by Ramesh Panwar; Ser. No. 08/882,525 identified as Docket No. P2370/37178.830082.000 for AN APPARATUS FOR RESTRAINING OVER-EAGER LOAD BOOSTING IN AN OUT-OF-ORDER MACHINE filed concurrently herewith by Ramesh Panwar and Ricky C. Hetherington; Ser. No. 08/882,220 identified as Docket No. P2371/37178.830083.000 for AN APPARATUS FOR HANDLING REGISTER WINDOWS IN AN OUT-OF-ORDER PROCESSOR filed concurrently herewith by Ramesh Panwar and Dani Y. Dakhil; Ser. No. 08/881,847 identified as Docket No. P2372/37178.830084.000 for AN APPARATUS FOR DELIVERING PRECISE TRAPS AND INTERRUPTS IN AN OUT-OF-ORDER PROCESSOR filed concurrently herewith by Ramesh Panwar; Ser. No. 08/881,728 identified as Docket No. P2398/37178.830085.000 for NON-BLOCKING HIERARCHICAL CACHE THROTTLE filed concurrently herewith by Ricky C. Hetherington and Thomas M. Wicki; Ser. No. 08/881,727 identified as Docket No. P2406/37178.830086.000 for NON-THRASHABLE NON-BLOCKING HIERARCHICAL CACHE filed concurrently herewith by Ricky C. Hetherington, Sharad Mehrotra and Ramesh Panwar; Ser. No. 08/881,065 identified as Docket No. P2408/37178.830087.000 for INLINE BANK CONFLICT DETECTION AND RESOLUTION IN A MULTI-PORTED NON-BLOCKING CACHE filed concurrently herewith by Ricky C. Hetherington, Sharad Mehrotra and Ramesh Panwar; and Ser. No. 08/882,613 identified as Docket No. P2434/37178.830088.000 for SYSTEM FOR THERMAL OVERLOAD DETECTION AND PREVENTION FOR AN INTEGRATED CIRCUIT PROCESSOR filed concurrently herewith by Ricky C. Hetherington and Ramesh Panwar, the disclosures of which applications are herein incorporated by this reference.

BACKGROUND OF THE INVENTION

1. Field of the Invention

The present invention relates in general to microprocessors and, more particularly, to a system, method, and microprocessor architecture providing a cache throttle in a non-blocking hierarchical cache.

2. Relevant Background

Modern processors, also called microprocessors, use techniques including pipelining, superpipelining, superscaling, speculative instruction execution, and out-of-order instruction execution to enable multiple instructions to be issued and executed each clock cycle. As used herein the term processor includes complete instruction set computers (CISC), reduced instruction set computers (RISC) and hybrids. The ability of processors to execute instructions has typically outpaced the ability of memory subsystems to supply instructions and data to the processors, however. Most processors use a cache memory system to speed memory access.

Cache memory comprises one or more levels of dedicated high-speed memory holding recently accessed data, designed to speed up subsequent access to the same data. Cache technology is based on a premise that programs frequently re-execute the same instructions. When data is read from main system memory, a copy is also saved in the cache memory, along with an index to the associated main memory. The cache then monitors subsequent requests for data to see if the information needed has already been stored in the cache. If the data had indeed been stored in the cache, the data is delivered immediately to the processor while the attempt to fetch the information from main memory is aborted (or not started). If, on the other hand, the data had not been previously stored in cache then it is fetched directly from main memory and also saved in cache for future access.

Typically, processors support multiple cache levels, most often two or three levels of cache. A level 1 cache (L1 cache) is usually an internal cache built onto the same monolithic integrated circuit (IC) as the processor itself. On-chip cache is the fastest (i.e., lowest latency) because it is accessed by the internal components of the processor. Also, latency to on-chip cache is usually predictable. On the other hand, off-chip cache is an external cache of static random access memory (SRAM) chips plugged into a motherboard. Off-chip cache has much higher latency, although is typically much shorter latency than accesses to main memory.

Modern processors pipeline memory operations to allow a second load operation to enter a load/store stage in an execution pipeline before a first load/store operation has passed completely through the execution pipeline. Typically, a cache memory that loads data to a register or stores data from the register is outside of the execution pipeline. When an instruction or operation is passing through the load/store pipeline stage, the cache memory is accessed. If valid data is in the cache at the correct address a "hit" is generated and the data is loaded into the registers from the cache. When requested data is not in the cache, a "miss" is generated and the data must be fetched from a higher cache level or main memory.

In a hierarchical cache system valid data may reside in any of a number of cache levels. Cache accesses generated by, for example, memory operations executing in the processor will have a variable latency depending on whether the data that is the target of the memory operation resides in cache, and if so, what is the lowest cache level that holds a valid copy of the data. Hence, any functional unit in the processor (e.g., arithmetic logic unit, instruction execution unit, and the like) cannot predict when operand data will be available or when the instruction will complete execution until the data is known to reside in the lowest cache level.

One method of handling this uncertainty is to delay instruction execution until all data required by that instruction is known to exist in the lowest cache level. This can be accomplished by stalling an execution pipeline until the memory operation is complete, then execution the instruction requiring the results of the memory operation. However, stalling the execution pipeline reduces overall processor performance. Because the execution pipeline includes a plurality of instructions at any given time, a pipeline stall results in a time penalty to all instructions currently in the pipeline when a stall occurs. Further, a pipeline stall can propagate to other pipelines due to data dependencies between instructions executing in different pipelines.

Another difficulty in hierarchical caches arises in filling a lower cache level with data returned from a higher cache level. To execute a line fill operation, a cache being filled must receive data and an address identifying the cache line that should hold the data. In conventional cache systems, the higher cache level returns both the data and the address. In the case of blocking cache designs, the returned data presents little difficulty because the higher cache level has absolute control over the address of the lower cache until the fill operation is complete. However, blocking caches stall the memory pipeline until the line fill operation completes and so slow memory access and overall processor performance.

Non-blocking caches enable the cache to process subsequent memory operations while a miss is being serviced by higher cache levels. While this speeds overall memory access, the non-blocking cache receives address signals from both the lower level devices generating cache access requests and higher cache levels trying to return data from cache misses. The higher level cache must now arbitrate for control over the lower level cache. In this sense, the cache fill operation is intrusive to the ability for the lower level cache's ability to service memory access requests. This arbitration increases cache complexity, slows memory access, and is inconsistent with high frequency design.

What is needed is an architecture and a method for operating a processor that non-intrusively handles cache fills and load misses.

In an in-order processor, instructions are executed in the order in which the instructions appear in the program code. Each instruction may generate results that are used by subsequent instructions. For example, a memory operation that loads data from memory into a register must be completed before an arithmetic operation that uses the data in the register can be executed to generate correct results. In these cases, the subsequent instruction is referred to as "dependent" or as having one or more dependencies on precedent instructions. A dependency is resolved when the precedent instructions have completed and their results are available to the dependent instruction. In-order processors execute instructions in program-defined order and so will not execute an instruction until all prior instructions from which it depends have completed.

Greater parallelism and higher performance are achieved by "out-of-order" processors that include multiple pipelines in which instructions are processed in parallel in an efficient order that takes advantage of opportunities for parallel processing that may be provided by the instruction code. Dependencies in an out-of-order processor must be tracked to prevent execution of a dependent instruction before completion of precedent instructions that resolve the dependencies in the dependent instruction. However, the processor cannot predict with certainty when the dependencies will be resolved due to the variable latencies of a hierarchical cache. Prior processors handle this problem by delaying execution of dependent instructions until the dependencies are resolved. This solution requires implementation of a feedback mechanism to inform the instruction scheduling portion of the processor when the dependency is resolved. Such feedback mechanisms are difficult to implement in a manner consistent with processors issuing and executing multiple instructions per cycle using a high frequency clock. Moreover, this solution also does not scale well. As attempts to execute more instructions in parallel are made, the number of resources required to track dependencies increases out of proportion to the number of resources used to actually execute instructions.

A need exists for a processor that executed dependent instructions in an efficient manner consistent with high frequency clock frequencies.

SUMMARY OF THE INVENTION

The present invention involves a processor that executes coded instructions using an instruction scheduling unit receiving the coded instructions and issuing an instruction for execution. A replay signaling device generates a signal indicating when the instruction failed to execute properly within a predetermined time. A replay device within the instruction scheduling unit responsive to the signaling device then reissues the instruction for execution.

In another aspect, the present invention involves a method for executing instructions including memory transactions. The instructions are registered in an instruction scheduling window. The instructions are issued for execution together with an instruction identification pointing to the instruction in the instruction window. Completion of each instruction is broadcasting at a predetermined time after issue. In response to a replay signal, a selected one of the instructions is reissued.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENTS

The present invention involves a method and apparatus that enable speculative issue of instructions. Techniques for speculative execution of instructions upon occurrence of a branch instruction are well known and are beneficially used in conjunction with the present invention. However, the present invention adds an additional layer of speculative processors by executing instruction before known valid results have been produced by precedent instructions. As used herein, a precedent instruction is any instruction producing a result that is used by a subsequent dependent instruction. The dependent instruction may use the precedent instruction result as an operand, for example, or may rely on condition codes set by the precedent instruction. Any instruction may be precedent to one or more dependent instructions and at the same time dependent on one or more other precedent instructions.

To maintain high instruction execution throughput in accordance with the present invention, there is desirably no feedback mechanism from the execution units to the processor portion that schedules instructions for execution. Hence, the scheduling portion has no visibility as to the completion status of an instruction. The present invention is particularly advantageous in the case of memory operations such as a LOAD and STORE instructions in the SPARC V9 instruction architecture, and common to most other instruction architectures. In memory operations, the instruction latency is variable because the operation may involve data in any of a number of cache levels, main memory, or in some form of mass storage. The latencies of these devices vary by several orders of magnitude. The present invention is useful in execution of any instruction, however, and particularly useful in any instruction where the processor cannot precisely predict latency.

In accordance with the present invention, dependent instructions are made available or "scheduled" for execution (i.e., issued to execution units) at a predetermined number of clock cycles or a predetermined time after the precedent instruction was issued. The predetermined time is selected on an instruction by instruction basis by the processor based on expected or assumed latencies in the processor. In the case of memory operations, the predetermined latencies are determined by assuming that the memory access request generated by the instruction will hit in the first level cache. It is contemplated that the first level cache may be distinct physical memory location for various instructions, hence, the assumed latency will differ on an instruction by instruction basis. The latency of the first level cache is substantially predictable allowing the predetermined latency for memory operations to be determined with high accuracy.

When the memory operation misses in the first level cache, however, the assumed latency is incorrect and dependent instructions will execute using incorrect data while a memory system retrieves the correct data from higher cache levels or main memory. In accordance with the present invention, the higher level cache not only returns data to the lower cache level, but also generates a signal causing the instruction generating the memory access request to replay. In other words, the higher level cache causes a reissue of the instruction, and any dependent instructions. Desirably, this reissue is synchronized with the data return such that the reissued instruction completes within the predetermined latency and all replayed dependent instructions receive correct data.

In this manner, the first level cache receives address information only from the functional units generating the cache access request and does not have to arbitrate between cache access requests and returning data. Also, execution pipelines need not be stalled to wait for returning data. Hence, only the instruction that generated the cache miss incurs a time penalty for the miss and other instruction in the execution pipeline are substantially unaffected by the cache miss.

The present invention is illustrated in a three-level cache system, however, it is contemplated that any number of cache levels may be implemented and make use of the present invention. The present invention is also described in terms of several basic mechanisms that cooperate to maintain high execution throughput. These mechanisms include speculative scheduling of instruction (i.e., scheduling a dependent instruction a predetermined number of clock cycles after the precedent instruction), rescheduling of instructions when data is returned from higher levels of the memory hierarchy, and reissue of the rescheduled instructions in synchronization with data returned from the higher levels of the memory hierarchy. It is contemplated that these mechanisms can work alone or in any combination to achieve some of the benefits in accordance with the present invention.

Figure 1:
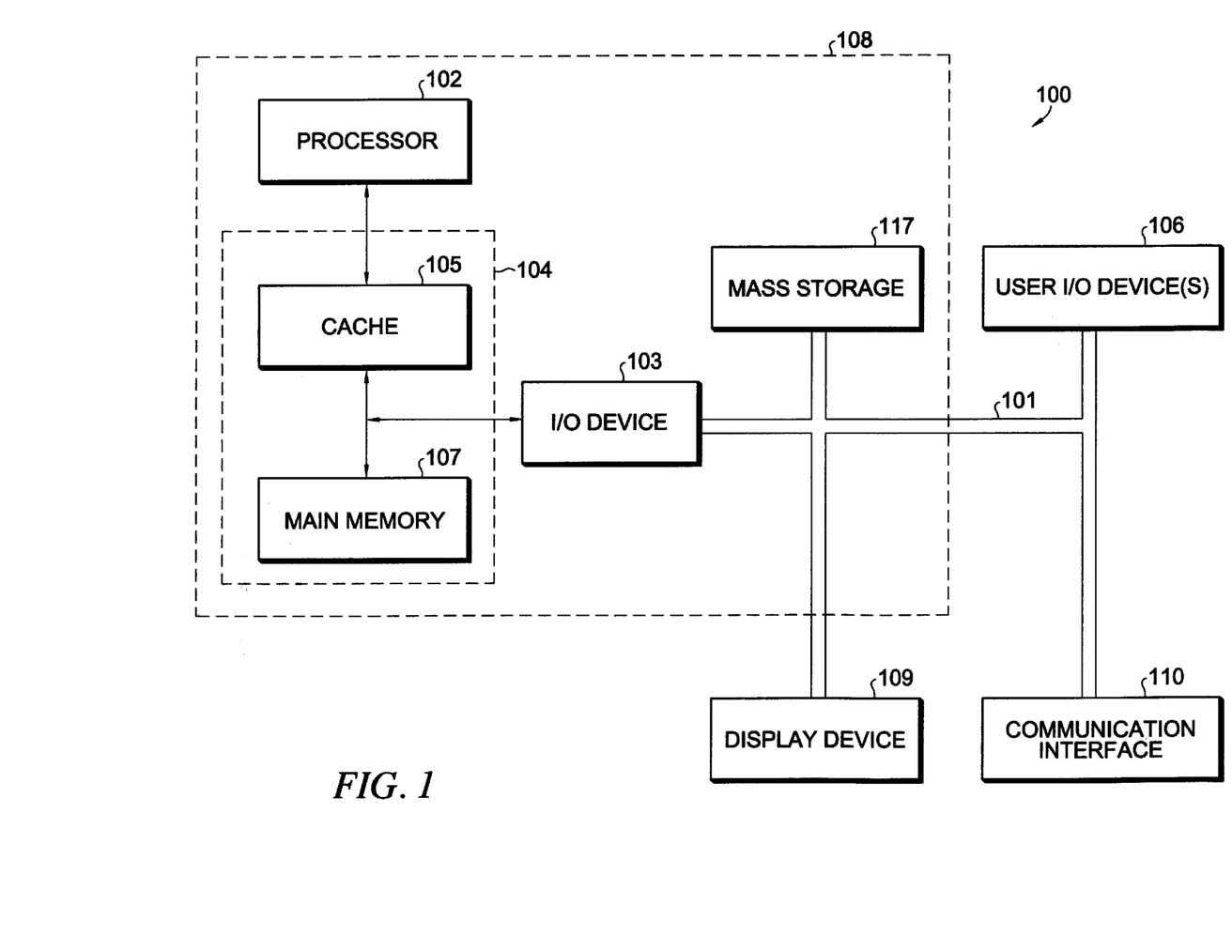
FIG. 1 shows in block diagram form a computer system incorporating an apparatus and system in accordance with the present invention.

Processor architectures can be represented as a collection of interacting functional units as shown in FIG. 1. These functional units, discussed in greater detail below, perform the functions of fetching instructions and data from memory, preprocessing fetched instructions, scheduling instructions to be executed, executing the instructions, managing memory transactions, and interfacing with external circuitry and devices.

Figure 2:
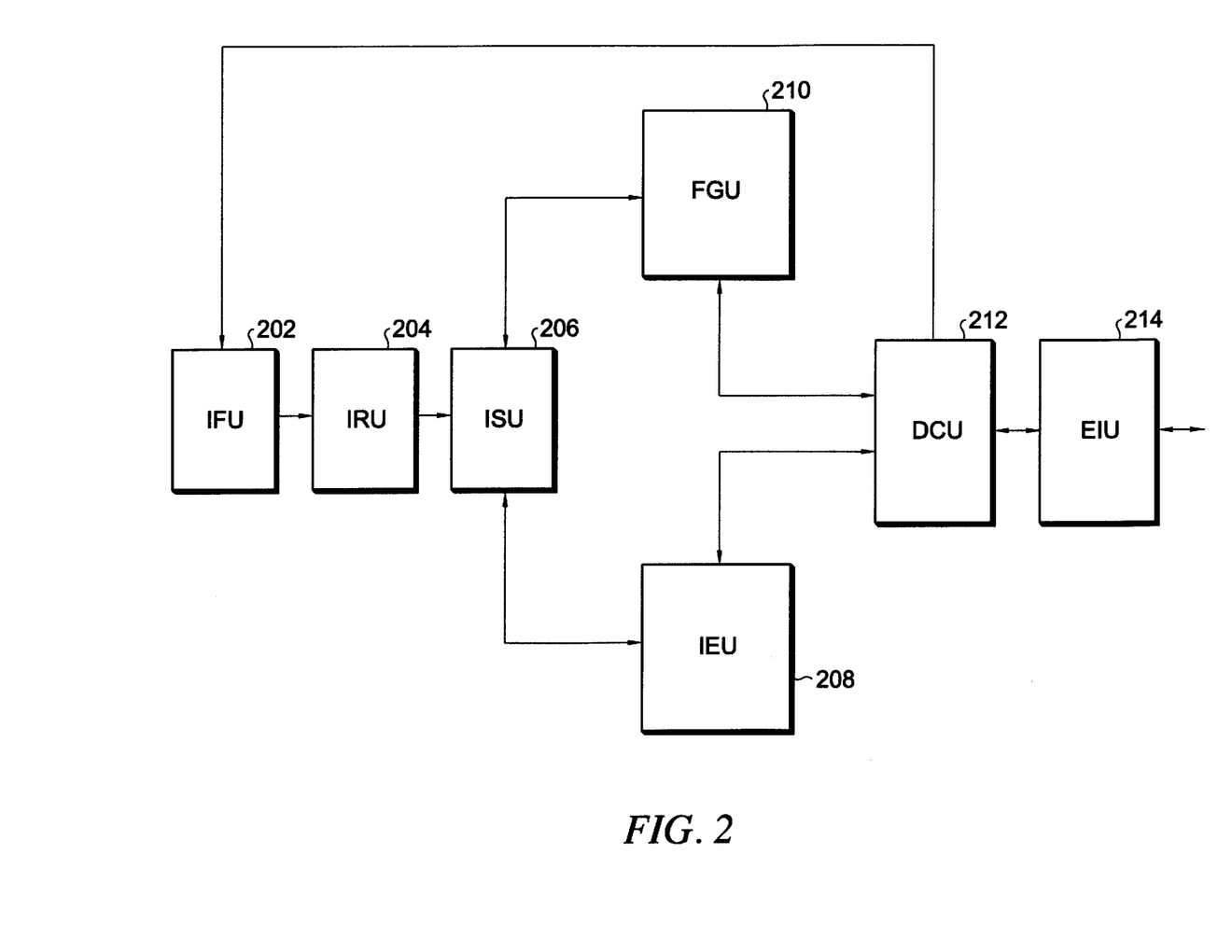
FIG. 2 shows a processor in block diagram form incorporating the apparatus and method in accordance with the present invention.

The present invention is described in terms of apparatus and methods particularly useful in a superpipelined and superscalar processor 102 shown in block diagram form in FIG. 1 and FIG. 2. The particular examples represent implementations useful in high clock frequency operation and processors that issue and executing multiple instructions per cycle (IPC). However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 1 shows a typical general purpose computer system 100 incorporating a processor 102 in accordance with the present invention. Computer system 100 in accordance with the present invention comprises an address/data bus 101 for communicating information, processor 102 coupled with bus 101 through input/output (I/O) device 103 for processing data and executing instructions, and memory system 104 coupled with bus 101 for storing information and instructions for processor 102. Memory system 104 comprises, for example, cache memory 105 and main memory 107. Cache memory 105 includes one or more levels of cache memory. In a typical embodiment, processor 102, I/O device 103, and some or all of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available input devices, include another computer. Mass storage device 117 is coupled to bus 101 and may be implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein. Some or all of mass storage 117 may be configured to be incorporated as a part of memory system 104.

In a typical computer system 100, processor 102, I/O device 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube (CRT) monitor, liquid crystal display (LCD) or any available equivalent.

FIG. 2 illustrates principle components of processor 102 in greater detail in block diagram form. It is contemplated that processor 102 may be implemented with more or fewer functional components and still benefit from the apparatus and methods of the present invention unless expressly specified herein. Also, functional units are identified using a precise nomenclature for ease of description and understanding, but other nomenclature often is often used to identify equivalent functional units.

Instruction fetch unit (IFU) 202 comprises instruction fetch mechanisms and includes, among other things, an instruction cache for storing instructions, branch prediction logic, and address logic for addressing selected instructions in the instruction cache. The instruction cache is commonly referred to as a portion (I$) of the level one (L1) cache with another portion (D$) of the L1 cache dedicated to data storage and located in data cache unit (DCU) 212. IFU 202 fetches one or more instructions at a time by appropriately addressing the instruction cache I$. Instructions are retrieved into I$ from secondary cache unit (SCU) L2$ (shown in FIG. 3) using addresses supplied to a memory scheduling window (MSU 502) in L2$, described in greater detail hereinafter.

In the absence of a conditional branch instruction, IFU 202 addresses the instruction cache I$ sequentially. The branch prediction logic in IFU 202 handles branch instructions, including unconditional branches. An outcome tree of each branch instruction is formed using any of a variety of available branch prediction algorithms and mechanisms. More than one branch can be predicted simultaneously by supplying sufficient branch prediction resources. After the branches are predicted, the address of the predicted branch is applied to the instruction cache I$ rather than the next sequential address. IFU 202 feeds addressed instructions to instruction rename unit (IRU) 204. Preferably, IFU 202 fetches multiple instructions each cycle and in a specific example fetches eight instructions each cycle grouped to form an instruction bundle.

IRU 204 comprises one or more pipeline stages that include instruction renaming and dependency checking mechanisms. The instruction renaming mechanism is operative to map register specifiers in the instructions to physical register locations and to perform register renaming to prevent dependencies in a particular example. IRU 204 further comprises dependency checking mechanisms that analyze the instructions to determine if the operands (identified by the instructions' register specifiers) cannot be determined until another "live instruction" has completed. The term "live instruction" as used herein refers to any instruction that has been fetched but has not yet completed or been retired. IRU 204 outputs renamed instructions to instruction scheduling unit (ISU) 206.

ISU 206 receives renamed instructions from IRU 204 and registers them for execution. Upon registration, instructions are deemed "live instructions" in a specific example and are assigned to an entry in the instruction scheduling window (ISW) and the instruction retirement window (IRW). ISW and IRW each comprise a plurality of entries where each entry is associated with one live instruction. Each entry comprises a number of fields holding information, including state information, about the associated instruction. ISU 206 is operative to schedule and dispatch instructions as soon as their dependencies have been resolved into an appropriate execution unit (e.g., integer execution unit (IEU) 208, or floating point and graphics unit (FGU) 210). ISU 206 desirably maintains trap status of live instructions. ISU 206 may perform other functions such as maintaining the correct architectural state of processor 102, including state maintenance when out-of-order instruction processing is used. ISU 206 may include mechanisms to redirect execution appropriately when traps or interrupts occur and to ensure efficient execution of multiple threads where multiple threaded operation is used. Multiple thread operation means that processor 102 is running multiple substantially independent processes simultaneously. Multiple thread operation is consistent with but not required by the present invention.

In operation, ISU 206 receives renamed instructions from IRU 204 and registers them for execution by assigning each instruction a position or slot in an instruction scheduling window (ISW). In a specific embodiment, the ISW includes one slot for every live instruction. Each entry in the ISW is associated with an entry in an instruction wait buffer (IWB) by an IWB POINTER. In accordance with the present invention, each entry in eth ISW is uniquely identified by an instruction identification (IID) that points the location of the entry holding a particular instruction. Dependency information about the instruction is encoded in the PID fields of the ISW entry. Metadata such as ready status, and latency information, for example, are stored in METADATA field of each entry in the ISW. Status information, included trap status, is stored in the STATUS field ISW entry. Instruction picker devices (not shown) pick instructions from the ISU that are ready for execution by generating appropriate word lines for the instruction wait buffer so that the instruction will be read out or issued to the execution units.

ISU 206 also operates to retire executed instructions when completed by IEU 208 and FGU 210. The IRW in ISU 206 performs the appropriate updates to architectural register files, condition code registers and the like upon complete execution of an instruction. ISU 206 is responsive to exception conditions and discards or flushes operations being performed on instructions subsequent to an instruction generating an exception in the program order. ISU 206 removes instructions from a mispredicted branch and redirects IFU 202 to fetch from the correct branch. An instruction is retired when it has finished execution and all older instructions have retired. Upon retirement the instruction's result is written into the appropriate register file and is no longer deemed a "live instruction".

IEU 208 includes one or more pipelines, each pipeline comprising one or more stages that implement integer instructions. IEU 208 also includes an integer result buffer (IRB) that holds the results and state of speculatively executed integer instructions. IEU 208 functions to perform final decoding of integer instructions before they are executed on th e execution units and to determine operand bypassing amongst instructions in an out-of-order processor. IEU 208 executes all integer instructions including determining correct virtual addresses for load/store instructions. IEU 208 also maintains correct architectural register state for a plurality of integer registers in processor 102. IEU 208 preferably includes mechanisms to access single and/or double precision architectural registers as well as single and/or double precision rename registers.

FGU 210, includes one or more pipelines, each comprising one or more stages that implement floating point instructions. FGU 210 also includes mechanisms for holding the results and state of speculatively executed floating point and graphic instructions. FGU 210 functions to perform final decoding of floating point instructions before they are executed on the execution units and to determine operand bypassing amongst instructions in an out-of-order processor. In the specific example, FGU 210 includes one or more pipelines dedicated to implement special purpose multimedia and graphic instructions that are extensions to standard architectural instructions for a processor. FGU 210 may be equivalently substituted with a floating point unit (FPU) in designs in which special purpose graphic and multimedia instructions are not used. FGU 210 preferably includes mechanisms to access single and/or double precision architectural registers as well as single and/or double precision rename registers.

Data cache unit 212 comprises one or more copies of a level one data cache D$ and is a primary data cache for IEU 208. In a particular example DCU 212 includes two independently addressable cache copies that receive the same data from higher level cache. FGU 210 communicates directly with secondary cache unit L2$ in the example of FIGS. 2 and 3 because DCU 212 would not be able to sustain the bandwidth required by floating point code. Hence, L2$ is the primary cache level for FGU 210. The data path in FIGS. 2 and 3 between DCU 212 and MSW 502 is bidirectional to provide return data to DCU 212 after a miss in DCU 212 and to enable writeback of data to L2$. In the particular example, L1$ accesses L2$ via MSW 502.

In accordance with the present invention, L2$ returns data only to DCU 212, and does not address DCU 212. In response to a cache miss in DCU 212, IEU 208 sends an instruction identification (IID) along with the target address to MSW 502 to form an access request to L2$. When this access request is filled either by L2$ or by higher cache levels or main memory via external interface unit (EIU) 214, the data is returned to DCU 212 and L2$ generates a replay signal coupled to ISU 206. The replay signal in a preferred embodiment comprises the IID of the instruction generating the cache access request that missed in DCU 212. ISU 206 responds to the replay signal to reissue the instruction from the ISU 206 to IEU 208. Desirably, ISU 206 also reissues any instructions that are dependent from the instruction causing the cache miss.

During execution of the reissued instruction, IEU 208 will generate another cache access request comprising an address to DCU 212. In a particular example, the reissue is synchronized such that the address arrives at DCU 212 from IEU 208 in synchronization with the data from L2$. This synchronization can be achieved, for example, by giving the replay signal a highest uninterruptible priority in ISU 206 such that the instruction identified by the replay signal is immediately reissued before any other instructions are issued. In this manner, DCU 212 receives addresses only from one location (i.e., IEU 208) and does not need to arbitrate between devices to determine which device receives address control. Preferably, DCU 212 comprises write through memory such that the returning data from L2$ is immediately available on the data line coupling DCU 212 to IEU 208. Hence, during the reissue instruction the cache access request is ensured of hitting in DCU 212.

An advantage of the method and apparatus in accordance with the present invention is that every instruction, including memory operations, can be assured of executing in with a predetermined latency either during its initial execution, or upon reissue execution. As described above, this is true even for memory operations where latency of the memory transaction is variable and unpredictable. The latency for memory operations can be determined by assuming that the operation will hit in the primary cache level because if the originally issued instruction misses in the primary cache level, the reissued instruction will hit in th e primary cache.

In accordance with another feature of the present invention, a predetermined latency is associated with each instruction, including memory operations such as LOAD and STORE instructions. This latency is included in the information associated with each instruction in the ISW of ISU 206. When a n instruction is issued, a latency counter is initiated that counts each clock cycle until the predetermined latency has expired. When the predetermined latency expires, the instruction is assumed to have completed. ISU 206 broadcasts this completion status to all other instructions in the ISW. Any instructions in the ISW that are dependent on the newly completed instruction can now be issued. Significantly, these dependent instructions are issued speculatively based on the assumption that the precedent instruction completed properly. In accordance with the present invention, there is no need for ISU 206 to wait to schedule the dependent instructions until DCU 212 actually inform IEU 208 or ISU 206 of the hit/miss status of the cache access request generated by the precedent instruction. In some embodiments it is desirable that the hit/miss status never be fed back to IEU 208 and/or ISU 206 to simplify circuitry.

Cache system 105 in accordance with the present invention is illustrated in greater detail in FIG. 3 through FIG. 7. Data cache system 105, comprises separate instruction and data caches (labeled I$ and D$ in FIG. 3 and FIG. 4) at the primary level, a unified on-chip level 2 cache (L2$) and a unified external level 3 cache (L2$ or E$). When processor 102 recognizes that data being read from memory is cacheable, processor 102 reads an entire 32-byte line into the appropriate cache (i.e., L1$, L2$, L3$, or all three). This operation is called a cache line fill. If the memory location containing that operand is still cached the next time processor 102 attempts the operand, processor 102 can read the operand from the cache instead of going back to memory. This operation is called a "cache hit".

When processor 102 attempts to read data from memory 107 into an architectural register, it first checks if a valid cache line for that memory location exists in the cache. Each cache line is associated with a status bit (V in FIG. 7) that indicates whether the line is valid (i.e., filled with known correct and up-to-date data). If a valid cache line exists, processor 102 reads the data from the cache instead of reading it from main memory 107. This operation is called a "read hit". If a read misses the cache (i.e., a valid cache line is not present for the area of memory being read from), cache memory system 105 continues to determine if the read will hit in a higher cache level. In the case that the missing cache does not have a line allocated for the requested memory location, one is allocated.

As the data is returned from higher cache levels or main memory, it is stored in the allocated cache line for future use. One feature of the present invention is that as the data is returned, it is also passed downward to lower cache levels and/or a lower level device in processor 102 that generated the cache access. For example, IEU 208 or FGU 210 could generate a cache access while executing an instruction. Similarly, the level 1 caches (I$, D$) could generate a cache access to the level 2 cache. In accordance with the present invention, the returning data is written through the cache level rather than waiting for that cache level to fill the line and validate the data.

This almost immediate data availability to the lower level devices must be coordinated so that the lower level device can receive the returning data. One aspect of the present invention uses signaling from upper cache levels to lower cache levels and other lower level devices to take control of the lower level devices at a highest uninterruptible priority and force the lower level device into a state where it will accept the data. These features of the present invention are described in greater detail hereinafter.

Figure 3:
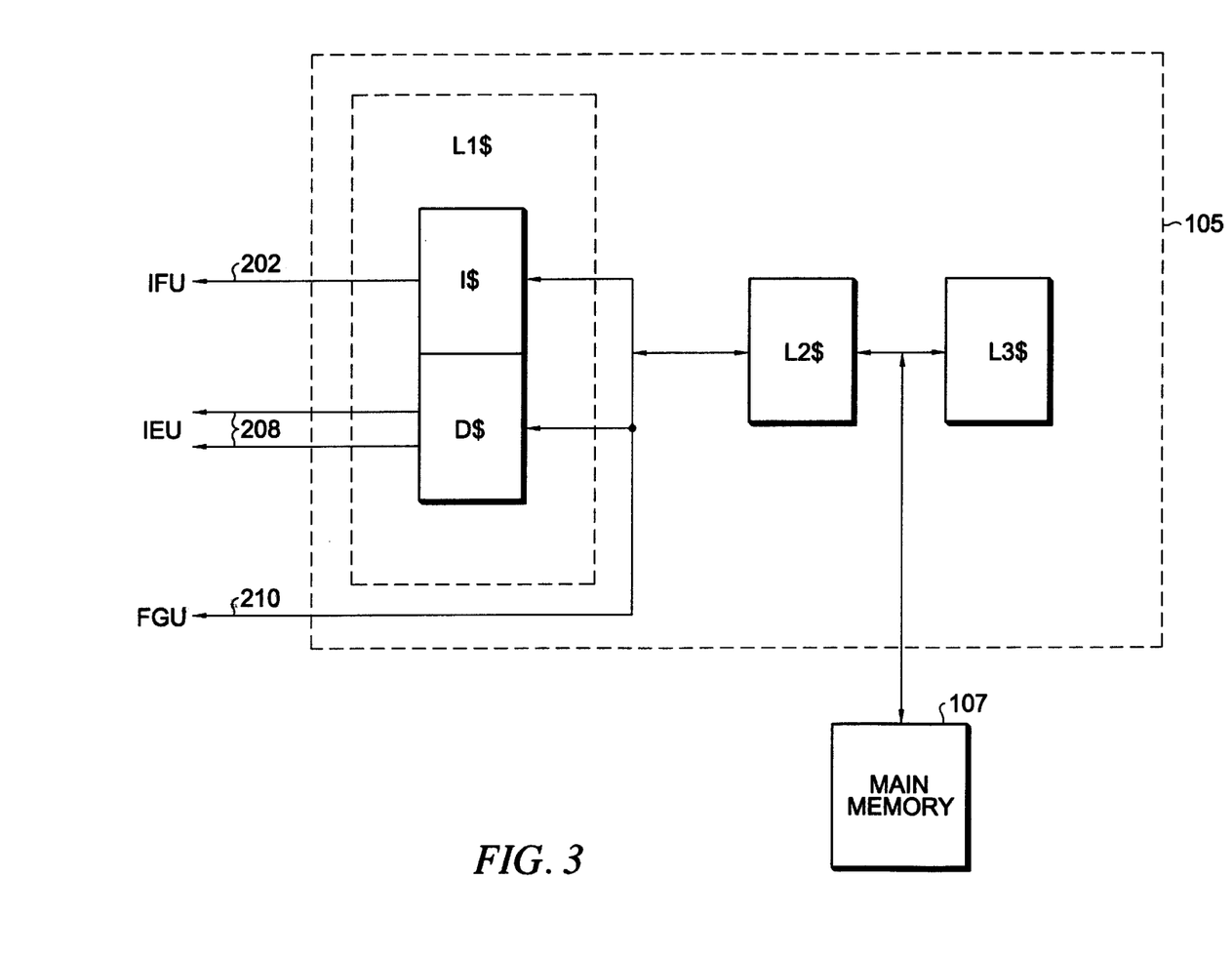
FIG. 3 illustrates in block diagram form a high level overview of a cache subsystem in accordance with the present invention.
Figure 4:
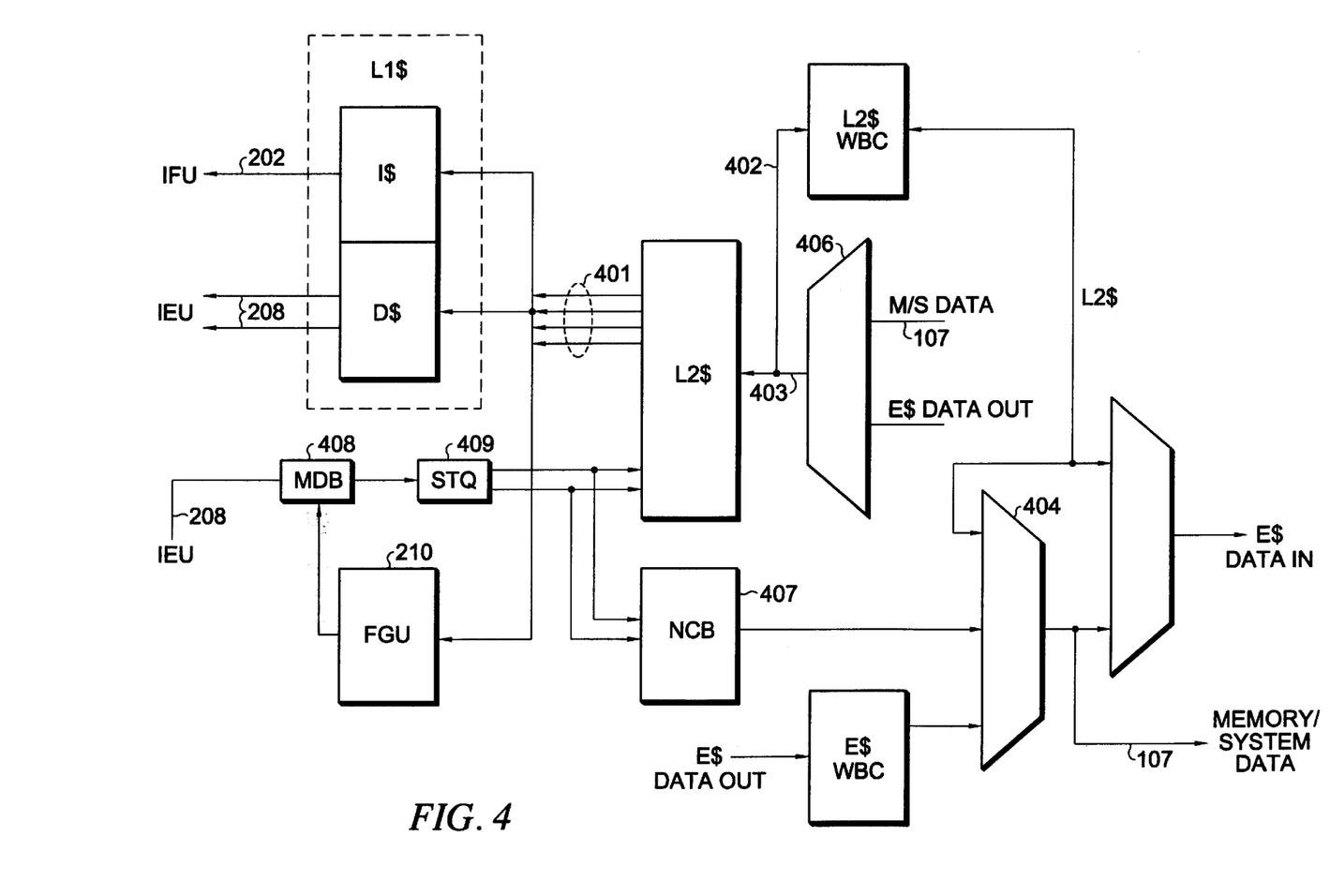
FIG. 4 shows data paths in the cache subsystem of FIG. 3 in block diagram form.

The level one data caches denoted as D$ services one or more loads or stores per cycle to IEU 208. In the particular implementation shown in FIG. 3, two operations per cycle are implemented by replicating D$ into two separate 64 KBytes caches that are kept identical. Other means of providing multiple accesses per cycle are known, and may be preferable in certain applications. However, duplicating D$ is straightforward, is compatible with fast operation, and an acceptable increase in hardware size because D$ is relatively small compared to higher cache levels. D$ is also implemented as a non-blocking cache is indexed virtually from two independent memory pipes. In the example of FIG. 3 and FIG. 4, both copies of D$ are read only data caches to improve performance. It should be understood that read-write data caches may be substituted and make use of the teachings in accordance with the present invention with predictable impact on performance and complexity.

The level 2 cache is a unified instruction and data cache in the example of FIG. 3 and FIG. 4. L2$ comprises four independent 8 byte read ports 401, a 16-byte write port 402, and a 32 byte fill and victim port 403 in a specific implementation. Preferably, L2$ is a fully pipelined, and non-blocking cache that comprises a mechanism (memory scheduling window 502 shown in FIG. 5) to track all outstanding memory references. Floating point data requests from FGU 210 are accessed directly from the L2 cache. Multiplexor 404 under control of cache unit 105 selectively couples either the output of E$, the output of the L2 write back cache, or output of non cacheable store buffer 407 to main memory 107. Multiplexor 406 under control of cache unit 105 selectively couples the E$ output or data from the memory bus to place on fill/victim port 403.

The level 3 cache is off-chip in the particular embodiment of FIG. 3 and FIG. 4. Most architectures must implement at least some cache off-chip. Latency of the off-chip cache may be 20–50 times that of on-chip cache. The L3 cache may be implemented using, for example, SRAM or dual data RAM (DDR). DDR is a synchronous component that provides a clock along with returned data that enables a data rate of 16 Gbyte/second or higher.

FIG. 4 shows a block diagram that highlights data paths throughout cache and memory subsystem 105 in accordance with the present invention. A data path from the level 2 cache to I$ is 256 bits (32 Bytes) wide in a particular example. The specific byte widths of access ports and data paths are provided to illustrate relative scale between components and are not a limitation on the teachings of the present invention. It is well known it adjust the data path widths to achieve particular operational performance. Both copies of the level 1 data caches D$ are filled from the level 2 cache with identical data from the same 32 Byte port. Because they are read only, independently reading the caches does not raise any coherency issues. If the multiple D$ caches were write enabled, additional measures would be required to ensure cache coherency between the D$ copies.

A memory disambiguation buffer (MDB) 408 feeds a store queue (STQ) 409. ISU 206, shown in FIG. 2 generates loads following unretired stores that may potentially access the same address. Detection of a "read after write" (RAW) hazard occurs in MDB 408 and this event generates a bypass of the store data to the pipes. MDB 408 also feeds STQ 409 where store coalescing will occur and the eventual write to the level 2 cache. Store coalescing reduces memory traffic by combining two or more memory operations into a single operation where the operations affect the same blocks of data and that data is stored in STQ 409.

The level 2 cache is unified and has four ports in the implementation shown in FIG. 3 and FIG. 4. Access to the level 2 cache is controlled by a memory scheduling window 502 shown in FIG. 5 which is a tracking mechanism for all accesses that caused a miss in the L1 I$ and D$ caches, FGU 210, the prefetching hardware in IFU 202, or the operating system during snoops. The external level 3 cache, labeled E$ in the figures, is accessed via an on-chip tag store in accordance with the present invention. In a particular example, E$ is 4-way set associative with a 256 bit data bus. The data bus connection to main memory 107 (and the system) is 128 bits wide.

Figure 5:
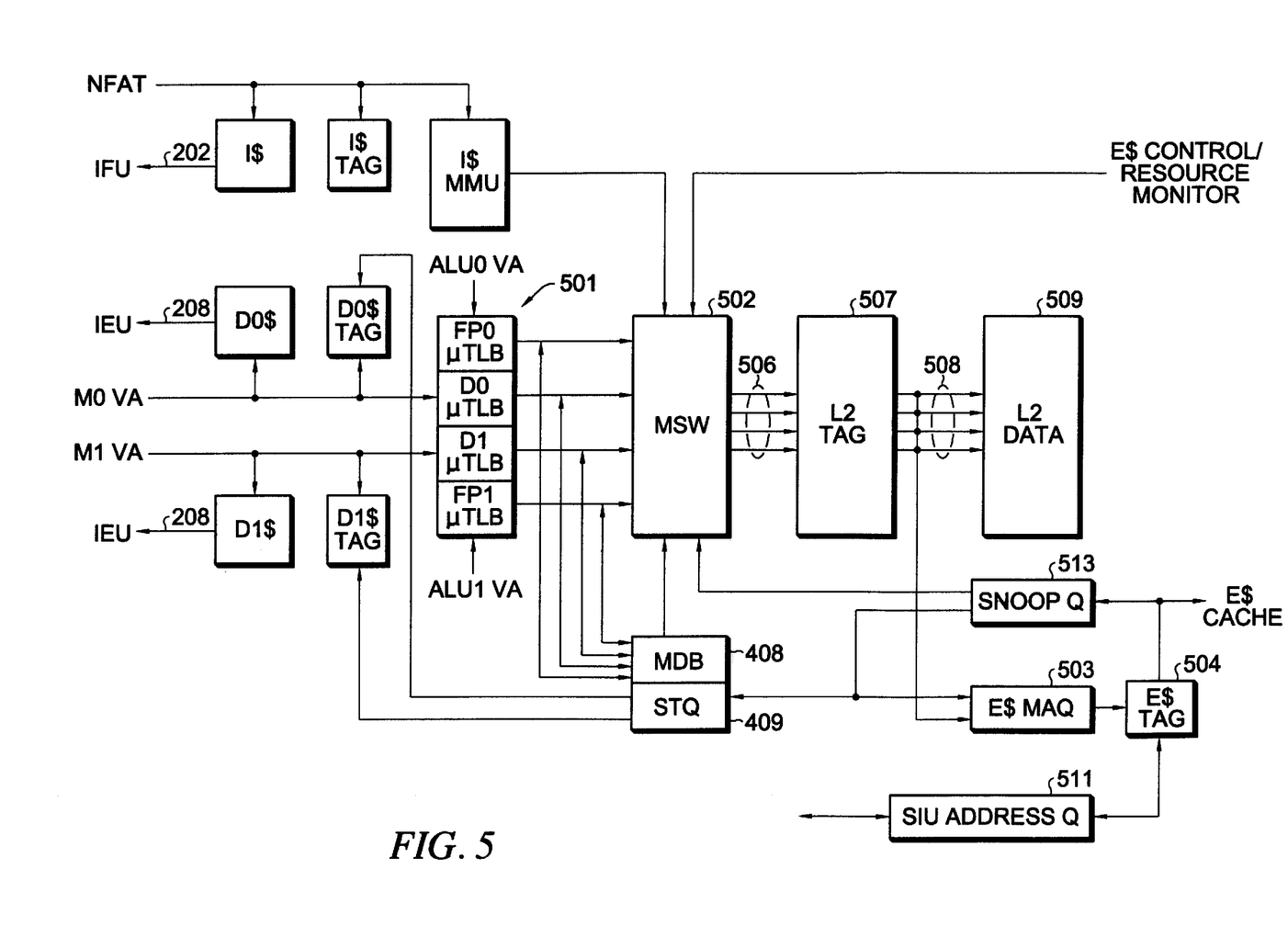
FIG. 5 illustrates address paths in the cache subsystem of FIG. 3 in block diagram form.

FIG. 5 illustrates address paths for cache/memory subsystem 105. The first level caches (I$ and all copies of D$) are virtually indexed and physically tagged. These caches have each line indexed by virtual address, however the tag bits are from the physical address determined after the virtual address is translated. In a particular implementation, I$ is 64 KByte four-way set associative cache that is addressed by a next fetch address table (NFAT) within IFU 202. Desirably, I$ is fully wave pipelined delivering 8 instructions per cycle. A miss in I$ is satisfied from either the level 2 cache or an instruction prefetch streaming buffer (not shown). Other implementations of I$ are possible including direct mapped, 2-way set associative, and fully associative and may be desirable in some applications. Accordingly, these other implementations are equivalent to the specific embodiments described herein for purposes of the present invention.

In a particular example, IEU 208 includes two memory pipes M0 and M1 generating effective virtual addresses (indicated by M0 VA and M1 VA in FIG. 5) for integer and floating point load and store operations. IEU 208 also includes two arithmetic logic units (ALU0 and ALU1) generating virtual addresses (indicated by ALU0 VA and ALU1 VA) dedicated for floating point loads and stores. Virtual to physical address translation occurs in a conventional manner through micro translation lookaside buffers ($\mu$TLBs) 501 that are hardware controlled subsets of a main translation lookaside buffer (TLB) (not shown). TLBs store the most-recently used virtual:physical address pairs to speed up memory access by reducing the time required to translate virtual addresses to physical addresses needed to address memory and cache.

In the implementation shown in FIG. 5, four integer/floating point loads are generated per cycle into the level 2 cache. The entry point into the level 2 cache is via memory scheduling window (MSW) 502 that tracks all memory operations not satisfied by the level 1 caches. MSW 501 functions to track all outstanding memory requests, retain addresses for fills and snooping and perform bank conflict resolution so that all four ports are afforded access the each of the banks of the level 2 cache. In a specific example, the L2 cache comprises 16 banks of 32 Kbyte memory. All four $\mu$TLBs generate addresses to MDB 408 and STQ 409 described hereinbefore. MDB 408 performs dynamic memory address disambiguation which enables the out-of-order execution of memory operations (e.g., LOAD and STORE operations).

MSW 502 includes four address ports 506 each of which can couple a new address to L2 TAG 507 every clock cycle. L2 TAG 507 operates in a conventional manner to index each line in L2 data portion 509 via lines 508. In the example of FIG. 5, L2 TAG 507 and L2 data portion 509 are organized as a four-way set associative cache. The present invention could alternatively be implemented in a direct mapped cache in which each main memory address maps to a unique location in the cache. In fully associative cache, data from any main memory address can be stored in any cache location. All tags must be compared simultaneously (i.e., associatively) with the requested address, and if one matches, then its associated data is accessed. Set associative cache is a compromise between direct mapped cache and a fully associative cache where each address is mapped to a set of cache locations. The four-way set associative cache of the specific example allows each address to map to four different cache locations.

E$ memory address queue (MAQ) 503 maintains a record of level 2 misses that are directed to the external level 3 cache and to main memory 107. It may be desirable to maintain the E$ TAG unit 504 on-chip even where the external cache is off-chip for high bandwidth and low latency. On-chip E$ TAG 504 also supports an off-chip associative cache. On-chip E$ TAG unit 504 enables processor 102 to filter system coherence snoops from EIU 214 to minimize the impact of snoops on processor 102 except when a match to the E$ TAG is detected.

The operating system may support an ability to "snoop" accesses to system memory and to their internal caches via snoop queue 513. This snooping ability is used to keep internal caches consistent both with system memory and with the caches in processor 102. The snoop capability is also relied on to provide cache coherency in multiprocessor applications.

Figure 6:
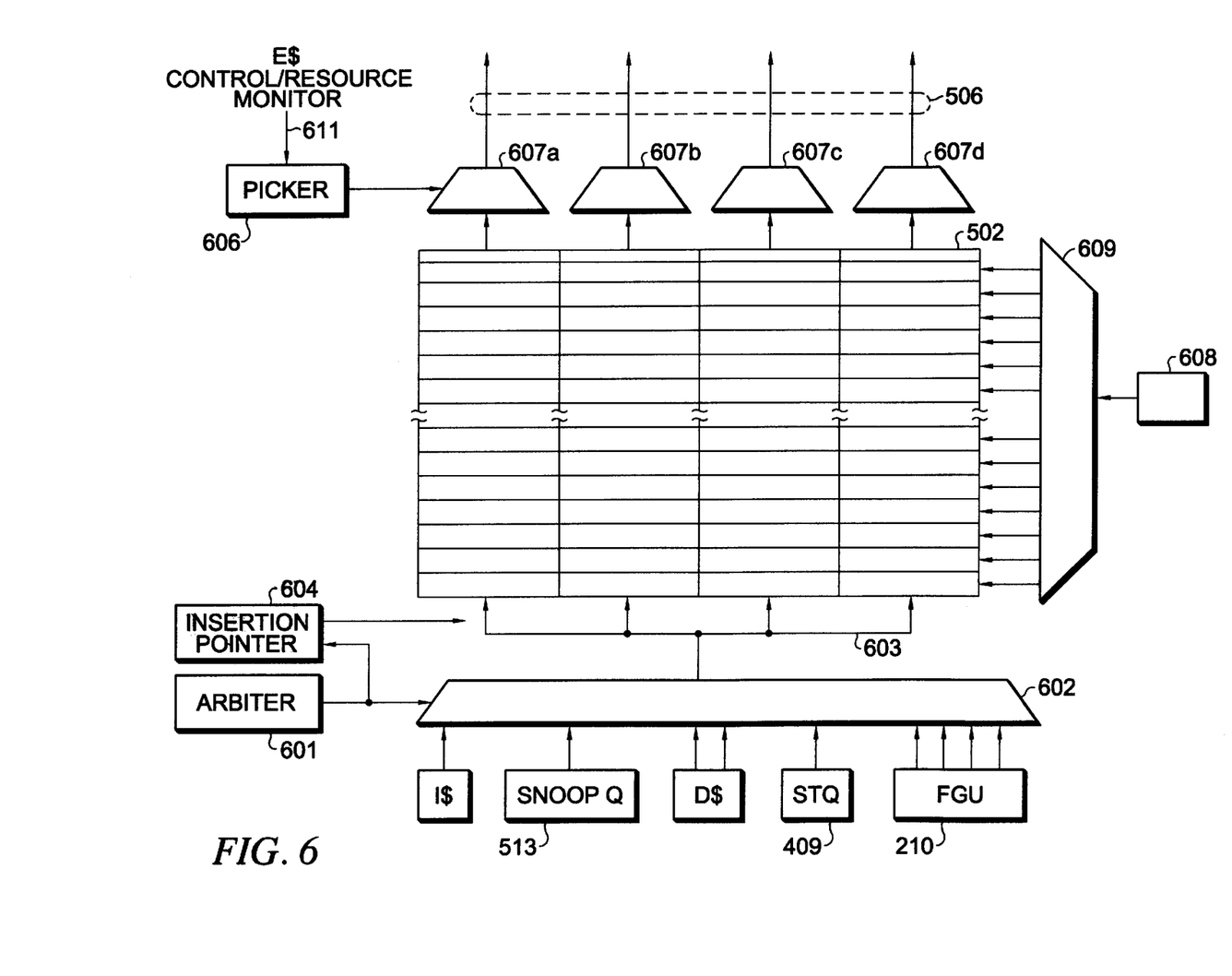
FIG. 6 illustrates operation of a memory scheduling window in accordance with the present invention.

FIG. 6 illustrates in block diagram form major features and connections useful in the operation of memory scheduling window 502. As described hereinbefore, all cache structures are desirably implemented as non-blocking cache. In the event of a miss to any cache, that cache is available for subsequent references. MSW 502 serves as a centralized memory reference management structure and as an entry point into the level 2 cache. MSW 502 may be equivalently implemented between, for example, main memory 107 and the level 3 cache (L3$ or E$) in addition to the implementation shown in FIG. 6. MSW 502 records, tracks and acts upon all references into the level 2 cache. MSW 502 is not informed of references that are satisfied at the level 1 caches in the exemplary implementations of the present invention, although it is contemplated that such information may be useful in some applications. All other cache/memory accesses will arbitrate and then create an entry into MSW 502.

The level 2 cache receives "bottom-up" access from the level one caches and FGU 210. These are referred to as bottom up because the access request originates from a lower cache level or a functional unit within the processor itself. Other bottom-up accesses are originated from I$, D$, STQ 409, and snoop queue 513. The level 2 cache also receives "top-down" accesses such as data from an L2 miss being pushed down from E$ or main memory 107. One feature of the present invention is that top-down accesses are always given priority over bottom-up accesses, eliminating the need for arbitration between top-down and bottom-up accesses.

Arbiter 601 referees among the requesting bottom-up agents for access to the L2 cache by controlling one or more multiplexors 602. Priorities are a matter of design choice to meet the needs of a particular application. In a specific example, arbiter 601 is given a strong bias to accesses from the L1 data and instruction caches (D$, I$) and a weak bias to the snoop queue 513, however it is contemplated that other priorities and biases will be useful in particular applications. MUX 602 selects the bottom up access as directed by arbiter 601 and couples the selected access to one of insertion ports 603.

MSW 502 is organized as a number of columns of entries. In the example of FIG. 5, MSW 502 includes the same number of columns (four) as the number of address ports 506 in the level 2 cache. In a particular example, each column includes 32 entries. Four entries in any given row are indexed at the same time by the row number (i.e. 0 to 31) allowing MSW 502 to launch up to four access requests to the level 2 cache simultaneously through ports 506. Desirably, the columns in MSW 502 wrap around such that row 0 is logically adjacent to row 31. Each column of entries in MSW 502 is coupled to receive bottom up accesses through one insertion port 603. Insertion port 603 is under control of insertion pointer 604. Any column may be coupled to any port 506 through multiplexors 607a, 607b, 607c, and 607d in response to select signals generated by picker 606.

Figure 7:
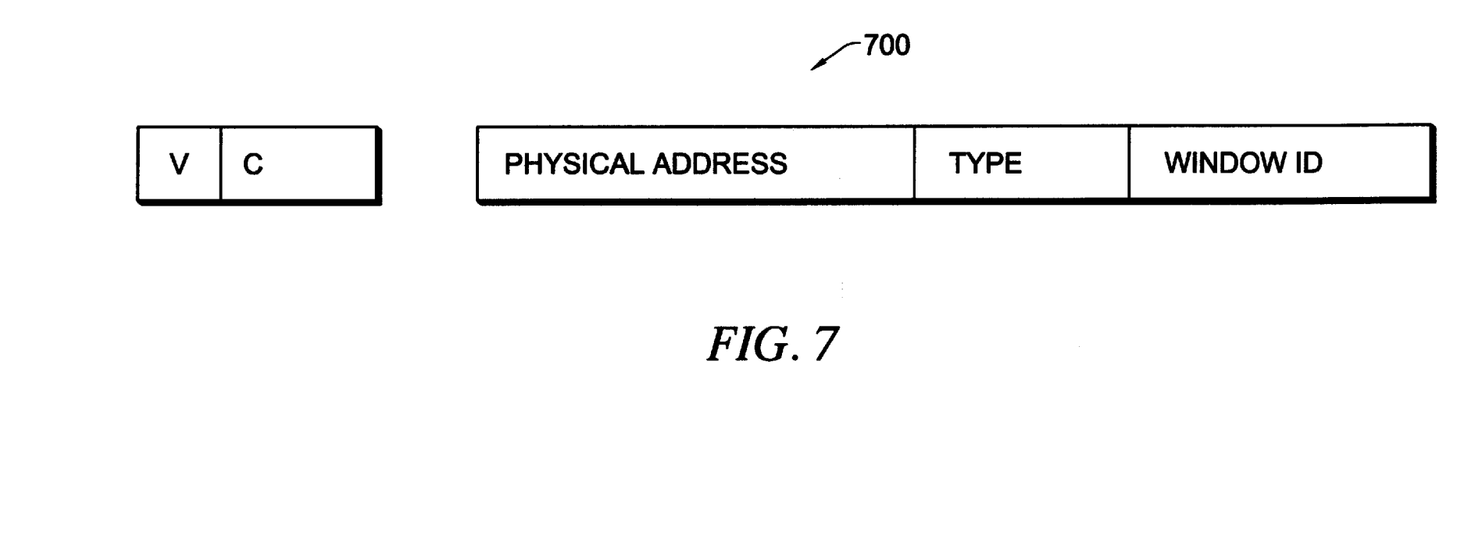
FIG. 7 illustrates an exemplary entry in the memory scheduling window shown in FIG. 6.

Each entry 700, shown in detail in FIG. 7, is associated with a valid bit (V) indicating whether the current entry is valid. When a memory operation is completed it is marked invalid indicating that the corresponding line in the level 2 cache can service bottom up access requests. Entries become invalid when the level 2 cache access is considered complete. A valid entry ping queue manager 608 is operative to set the valid bit directly in each entry through multiplexor 609. Valid entry ping manager 608 is desirably used because an access request can be terminated at anytime after insert or removal.

One or more conflict (C) bits used for conflict checking are associated with each entry. A conflict exists when two entries include addresses that map to the same bank. These entries conflict and should not be launched at the same time. Similarly, each entry includes a type identifier that indicates the type of access represented (e.g., read, write, floating point, instruction, data). Differing data types may return differing amounts of data on each access, and so not all types allow four accesses to be launch simultaneously. For example, accesses generated to fill I$ and D$ are serviced by 32 byte data loads whereas accesses generated by FGU 210 generated 8 byte data loads in the particular examples given herein. The type identifier allows MSW 502 to prevent launching an I$ and D$ simultaneously (or with a floating point load) as the I$ and D$ will occupy the entire data port in the particular example. It is contemplated that other type identifiers may be used. Moreover, in some applications, for example where all data types generate loads of similar width, type identifiers would not be needed.

A number of physical address (PA) bits identifying a physical memory address that is the target of a particular memory operation. It is the PA that is actually applied to the level 2 cache on address ports 506 to access a specific location in the level 2 cache. If the level 2 cache were virtually addressed, the PA fields would by equivalently substituted by virtual address bits.

In accordance with the present invention, each entry includes an instruction id (IID). The IIDs point to an instruction in the instruction scheduling window within instruction scheduling unit 206 (shown in FIG. 2) for every integer load. The IID as selected by picker 606 alerts or signals ISU 206 that the load pointed to by the IID filed should be replayed so that the index of the load is available at the D0/D1 caches when data is supplied by the level 2 cache. Hence, the returned IID serves as the replay signal discussed hereinbefore Every integer load that misses in the D$ cache is tagged with a IID and ISU 206 expects a response for all outstanding loads. Since up to two integer loads can be received each clock cycle, picker 606 can send up to two IIDs pack to ISU 206.

Insert pointer 604 selects the next available entry in each pane. An entry is considered available when it is empty or when it is an invalid but fully resolved entry. Insert pointer 604 indexes to a next entry beyond where it currently points and examines the V and C bits to decide if it can insert. If yes, then it increments it's pointer and moves forward. Nothing stalls insertion except for the queue wrapping to an entry that is not completed (valid). To simplify operation of insertion pointer 604, it will not jump over any invalid entries in search of valid ones. However, more efficient use may be made of MSW 502 if such jumping is enabled, at the cost of increased complexity.

Once an entry is created and inserted in MSW 502, there are optionally performed a number of camming checks. Examples of such camming checks include a transit check which is a detection of whether there is any older access in flight to the same cache set, a secondary reference check which checks to see if the exact same cache block is currently being fetched from the L3 cache or Main Memory 107 by an earlier access, and a bank conflict check which is a check across the four ports of an entry to detect bank conflicts within the entry. These camming checks can be implemented using known content addressable memory (CAM) techniques, circuits, and hardware and would desirably be performed in a single clock cycle. When the camming checks are the valid bit (V) is asserted and picker 606 can pick that entry for L2 access.

Picker 606 selects valid entries from MSW 502 for access to the L2 cache. In normal operation picker 606 "chases" insert pointer 604. The results of these accesses are not known to picker 606. Unlike conventional cache organizations that maintain a count of accesses that have missed and generated accesses to higher cache levels or main memory, picker 606 in accordance with the present invention does not include any self-throttling mechanisms that act in response to a level 2 cache miss. Hence, in normal operation picker 606 operates as if every access results in a hit in the level 2 cache.

In fact, some access will hit in the level 2 cache and some will miss which are then sent on to the level 3 cache. These misses can also cause write backs from the level 2 cache to the level 3 cache (which is also not known to picker 606). In accordance with the present invention, as references to the L3 are resolved, E$ includes a control/resource monitor unit that enables the L3 cache (E$) to take control of picker 606 via control line 611 and point picker 606 at a particular entry or set of entries associated with a miss. Preferably, this control is complete and unarbitrable.

When the level 3 operation is complete it releases control of picker 606 and allows the picker to resume normal operation. By allowing the level 3 cache to take absolute control of the picker in a manner that disables its ability to generate further requests, the level 3 cache can also monitor and control its own resources. The level 3 cache is aware of its own resource limitations such as the number of outstanding references to E$, remaining capacity in E$ MAQ 503, remaining capacity in snoop Q513, and the like. When one or more resources are expended or used to a predetermined "high water mark", the level 3 cache uses that awareness in accordance with the present invention to prevent further access until the sufficient resources become available. The level 3 cache prevents further access by causing picker 606 to stall.

In accordance with the present invention, when an access request misses in the level 2 cache the MSW identification (i.e. row number in MSW 502) of the request that missed is appended to the request as it is forwarded to the level 3 cache. As outstanding references in E$ complete, E$ uses the appended index to point picker 606 to selected entries 700 in MSW 502 that either perform the fill or writeback, eventually clearing the stall condition in the level 3 cache. Finally, the level 3 controller releases the picker for normal operation.

All requests selected by picker 606 for access to the L2 cache are tagged for tracking throughout the cache and memory hierarchy with an MSW ID. The MSW ID is a reference that causes picker 606 to point to a particular entry. When a miss occurs on any level 2 access, the MSW ID is appended to the request at the level 3 cache. When data is returned for this request, the corresponding MSW ID for the entry being filled is forced on to picker 606 by the E$ control/resource monitor and overrides the current pointer position of picker 606. In turn, MSW 502 provides the appropriate index to the L2 cache for storing the data returned from E$ or main memory 107. This mechanism is also used for victim processing.

As set out hereinbefore, as data is returned, it is substantially simultaneously passed downward (i.e., in parallel) to lower cache levels and/or a lower level device in processor 102 that generated the cache access. The term "substantially simultaneously" means that the return data is transferred downward without waiting for the data to be stored and marked valid in the cache (i.e., before the cache fill operation is complete.

In the case of accesses generated by misses in the level 1 data caches D0$ and D1$, the IID within an entry is accessed when picker 606 is forced to point at that entry. The IID alerts downstream logic, specifically ISU 206, to "replay" the instruction generating the corresponding cache access. This replay results in a reissue of the access request that missed. Preferably, this reissue is synchronized with the returned data such that the returned data arrives at the D0$ or D1$ substantially simultaneously with the reissued access. Because the instruction replay mechanism aligns the arrival of the index of the load address at the first level cache, the operation has the appearance of a read (i.e., a read or load instruction is executed) but in effect performs as a write operation. In this sense, the write operation is enabled by the replay signal generated in response to the IID and data is written into storage locations (e.g., architectural registers) within the functional unit generating the cache assess request.

While the invention has been particularly shown and described with reference to a preferred embodiment thereof, it will be understood by those skills in the art that various other changes in the form and details may be made without departing from the spirit and scope of the invention. The various embodiments have been described using hardware examples, but the present invention can be readily implemented in software. Accordingly, these and other variations are equivalent to the specific implementations and embodiments described herein.

We claim:

1. A processor for executing a precedent instruction and a subsequent instruction that is dependent on the precedent instruction completing with data from a cache hit within a predetermined time, the processor comprising:

an instruction scheduling unit that issues the precedent instruction for execution and issues the subsequent instruction for execution at the predetermined time after issuing the precedent instruction;

a replay signaling device that generates a replay signal if execution of the precedent instruction results in a cache miss; and a replay device responsive to the replay signal that reissues the precedent instruction for execution synchronized to complete with data from the cache hit within the predetermined time.

2. The processor of claim 1 wherein the replay signal comprises an instruction identification that points to the instruction in the instruction scheduling unit.

3. The processor of claim 1 further comprising a queue coupled to the replay device for storing the subsequent instruction, the replay device reissuing the subsequent instruction from the queue at the predetermined time after the reissue of the precedent instruction.

4. The processor of claim 1 wherein the predetermined time is determined by the number of clock cycles required for the precedent instruction to complete correctly when the precedent instruction execution results in a cache hit.

5. The processor of claim 1 further comprising:

a cache fill generated in response to the cache miss wherein the replay signal is synchronized with the cache fill to cause the reissued precedent instruction to return with data from the cache hit within the predetermined time after the precedent instruction was reissued.

6. In a processor that is coupled to memory including a first and a second cache, the processor executing coded instructions, apparatus comprising:

an instruction scheduling unit receiving the coded instructions and issuing a first instruction for execution, said first instruction having a target latency time that is based upon a latency time of the first cache;

a replay signaling device indicating when the first instruction failed to execute within the target latency time, whereupon the second cache operates to supply data that is related to the first instruction to the first cache and a replay signal is generated; and a replay device responsive to the replay signal for reissuing the first instruction for execution synchronized to complete with data from the first cache within the target latency time.

7. The processor of claim 6 further comprising:

a dependent chain of instructions queued in the instruction scheduling unit, wherein the dependent chain of instructions are dependent upon a result of the first instruction, the replay device being responsive to the signaling device to reissue the dependent chain of instructions.

8. The processor of claim 6 further comprising:

a dependent instruction queued in the instruction scheduling unit, wherein the dependent instruction is dependent upon a result of the first instruction, the instruction scheduling unit issuing the second instruction a predetermined number of clock cycles after the first instruction has issued without regard to completion status of the first instruction.

9. The processor of claim 6 wherein as each instruction is issued, it is issued together with an instruction identification (IID) that points to the instruction in the instruction scheduling unit.

10. The processor of claim 6 further comprising:

a plurality of entries in the instruction scheduling unit, each entry including an instruction and each entry including a latency field indicating an expected target latency time for the instruction within the entry; and a dependent instruction queued in the instruction scheduling unit, wherein the dependent instruction is dependent upon a result of the first instruction, wherein the dependent instruction is issued when the expected latency time of the first instruction has expired.

11. The processor of claim 10 further comprising:

a latency counter associated with each entry in the instruction scheduling unit, the latency counter decrementing the expected latency each clock cycle, wherein when the expected latency reaches zero the associated instruction is assumed to have completed execution.

12. The processor of claim 6 further comprising:

an instruction execution unit generating a data access request in response to a memory operation;

wherein the first cache is a first non-blocking cache receiving the data access request from the instruction execution unit;

wherein the second cache is a second non-blocking cache coupled to the first non-blocking cache to service misses in the first non-blocking cache; and a data return path coupled to the second non-blocking cache coupling data returning from the second non-blocking cache the first non-blocking cache, wherein the replay signaling device is responsive to the returning data.

13. The processor of claim 12 wherein the first non-blocking cache is addressed exclusively by the data access requests from the instruction execution unit and the first non-blocking cache receives data exclusively from the second non-blocking cache.

14. The processor of claim 12 wherein each data access request comprises an instruction identification that points to an instruction in the instruction scheduling unit.

15. A computer system comprising:

a memory;

a processor coupled to the memory, the processor further comprising:

an instruction scheduling unit receiving coded instructions and issuing a first instruction for execution, said first instruction comprising a memory operation;

the first instruction providing dependency for a second instruction;

the instruction scheduling unit issuing the first instruction for execution and thereafter issuing the second instruction for execution at a predetermined time after issuing the first instruction;

a replay signaling device generating a replay signal indicating when the first instruction failed to execute properly within the predetermined time; and a replay device within the instruction scheduling unit responsive to the replay signal for reissuing the first instruction for execution synchronized to complete within the predetermined time.

16. The computer system of claim 15 further comprising:

a dependent instruction queued in the instruction scheduling unit, wherein the dependent instruction is dependent upon a result of the first instruction, the instruction scheduling unit issuing the dependent instruction a predetermined number of clock cycles after the first instruction has issued without regard to completion status of the first instruction.

17. The computer system of claim 15 further comprising:

a dependent chain of second instructions queued in the instruction scheduling unit, wherein the dependent chain of second instructions are dependent upon a result of the first instruction, the replay device being responsive to the signaling device to reissue the dependent chain of second instructions.

18. The computer system of claim 15 wherein the second instruction is issued a predetermined number of clock cycles after the first instruction has issued without regard to completion status of the first instruction.

* * * * *